US008413736B2

(12) United States Patent
Gerber

(10) Patent No.: US 8,413,736 B2
(45) Date of Patent: Apr. 9, 2013

(54) FARMING IMPLEMENT FOR SEPARATING GROUND ELEMENTS

(76) Inventor: Roger Gerber, Ollon (CH)

( * ) Notice: Subject to any disclaimer, the term of this patent is extended or adjusted under 35 U.S.C. 154(b) by 0 days.

(21) Appl. No.: 12/529,133

(22) PCT Filed: Feb. 21, 2008

(86) PCT No.: PCT/IB2008/050623
§ 371 (c)(1),
(2), (4) Date: Aug. 28, 2009

(87) PCT Pub. No.: WO2008/104903
PCT Pub. Date: Sep. 4, 2008

(65) Prior Publication Data
US 2010/0116516 A1      May 13, 2010

(30) Foreign Application Priority Data

Feb. 28, 2007   (EP) .................................... 07103241

(51) Int. Cl.
*A01B 17/00*        (2006.01)
(52) U.S. Cl.
USPC .................. 172/32; 172/112; 171/15; 171/85
(58) Field of Classification Search ............ 172/32, 172/112; 171/14, 15, 84, 85, 88, 90, 111, 171/114, 115, 49, 67, 138; 209/44; 299/7
See application file for complete search history.

(56) References Cited

U.S. PATENT DOCUMENTS

| 204,531 | A | * | 6/1878 | Brown | 171/13 |
|---|---|---|---|---|---|
| 231,101 | A | * | 8/1880 | Roderick | 171/15 |
| 685,352 | A | * | 10/1901 | Schunicht | 171/116 |
| 781,987 | A | * | 2/1905 | Aspinwall | 171/27 |
| 904,264 | A | * | 11/1908 | Keibel | 171/83 |
| 3,563,191 | A | | 2/1971 | Yovanovich | |
| 3,777,327 | A | * | 12/1973 | Ellis | 15/84 |
| 4,548,275 | A | | 10/1985 | Squier | |
| 4,560,009 | A | * | 12/1985 | Lindbeck | 172/66 |
| 5,671,839 | A | | 9/1997 | Sanderson | |
| 6,192,992 | B1 | * | 2/2001 | Gossop | 172/133 |
| 6,321,849 | B1 | * | 11/2001 | Underhill | 172/22 |
| 6,488,100 | B2 | * | 12/2002 | Underhill | 172/22 |
| 2002/0056555 | A1 | * | 5/2002 | Underhill | 172/22 |

FOREIGN PATENT DOCUMENTS

| EP | 0 039 792 A | | 11/1981 |
|---|---|---|---|
| FR | 382 381 A | | 2/1908 |
| FR | 2589032 A1 | * | 4/1987 |
| GB | 2238219 | | 5/1991 |
| WO | WO 8907387 A1 | * | 8/1989 |

OTHER PUBLICATIONS

Aug. 4, 2008 International Search Report prepared by the French Patent Office for International Application PCT/IB08/050623.
Aug. 4, 2008 Written Opinion prepared by the French Patent Office for International Application PCT/IB08/050623.
Aug. 4, 2008 Written Opinion prepared by the French Patent Office for International Application PCT/IB08/050623, English Translation.

* cited by examiner

*Primary Examiner* — Jamie L McGowan
(74) *Attorney, Agent, or Firm* — Sheridan Ross P.C.

(57) ABSTRACT

The machine of the invention includes a separator comprising rotary transport means and sorting means for sorting the soil and the stones collected when digging a trench and for redepositing them in a desired manner in said trench.

9 Claims, 4 Drawing Sheets

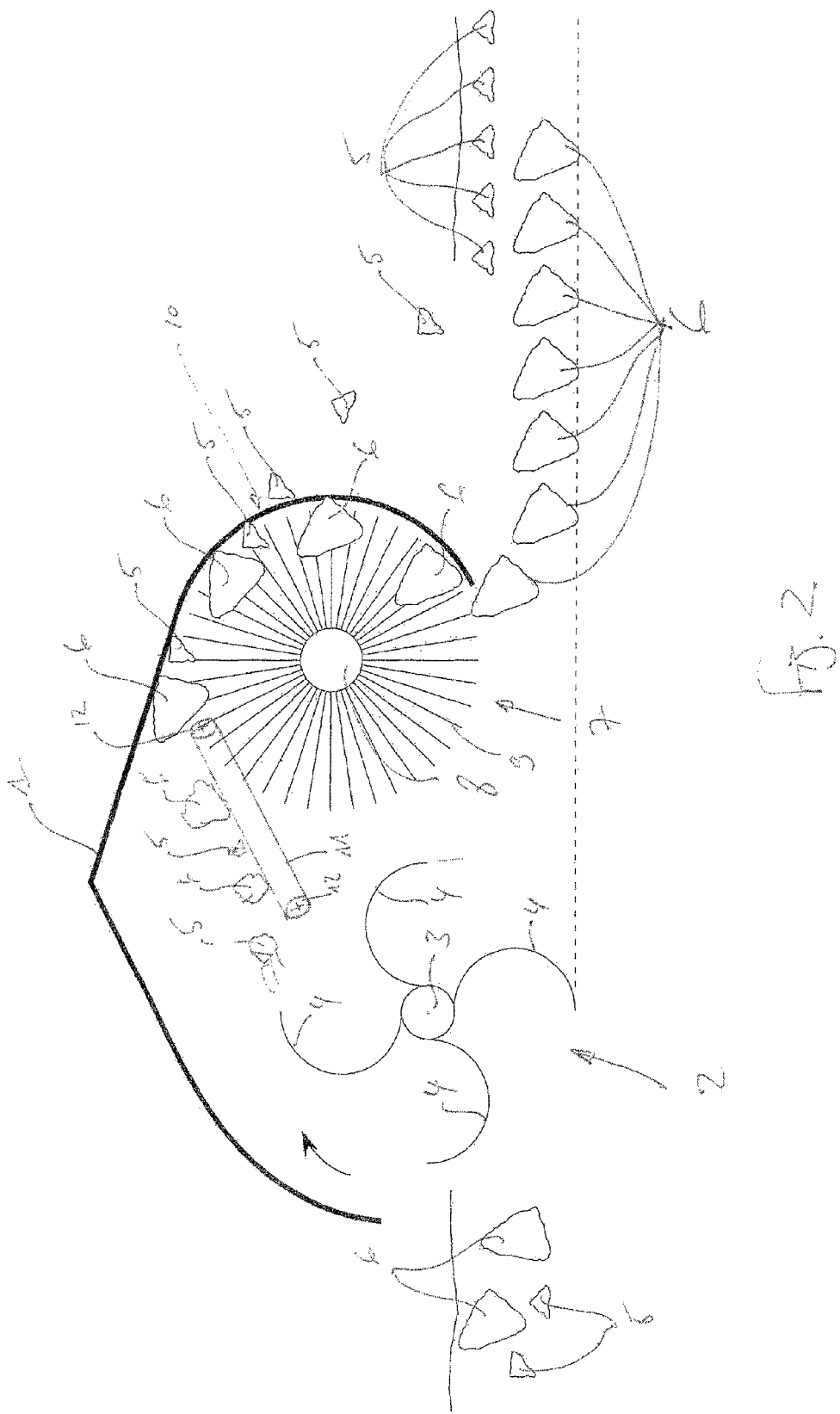

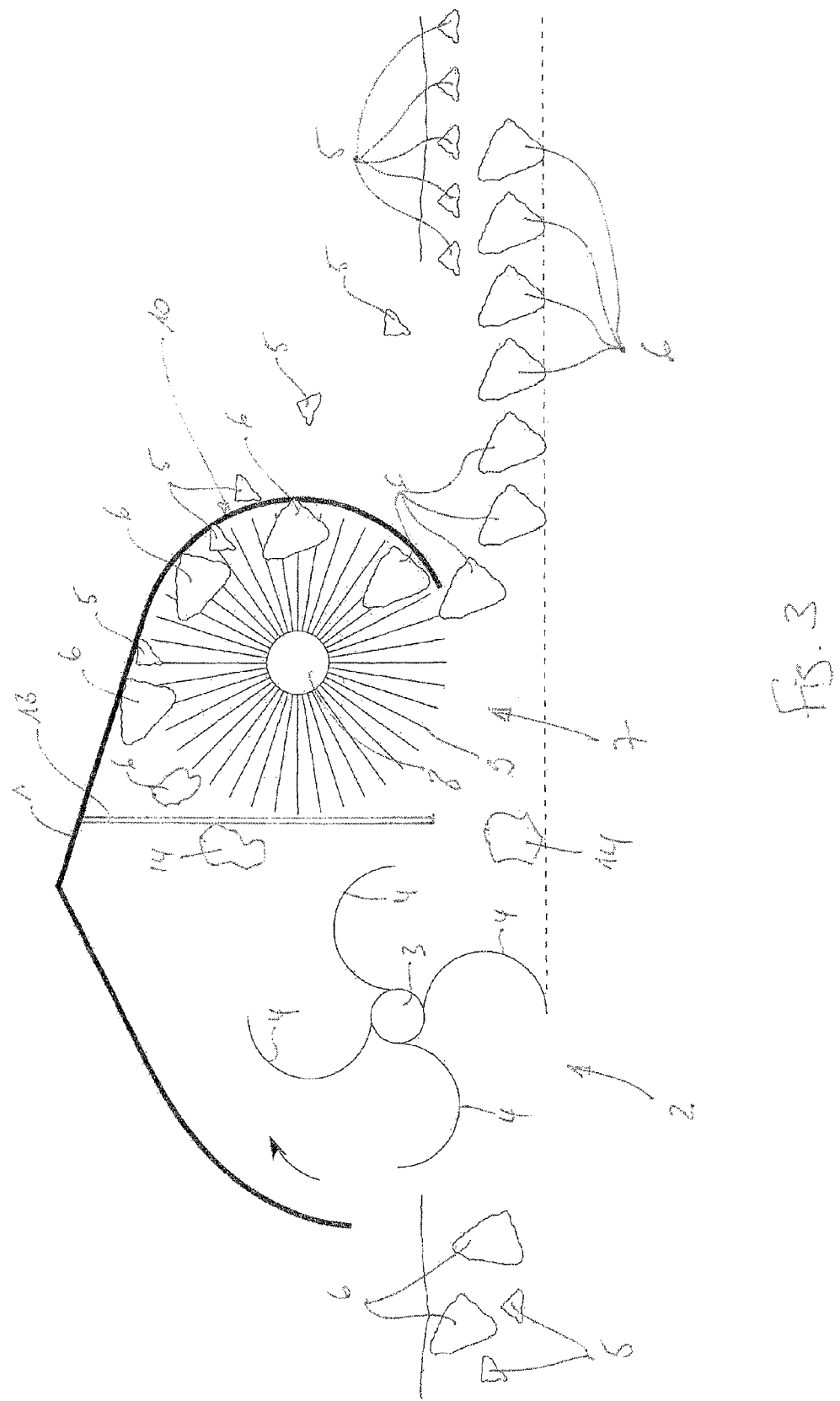

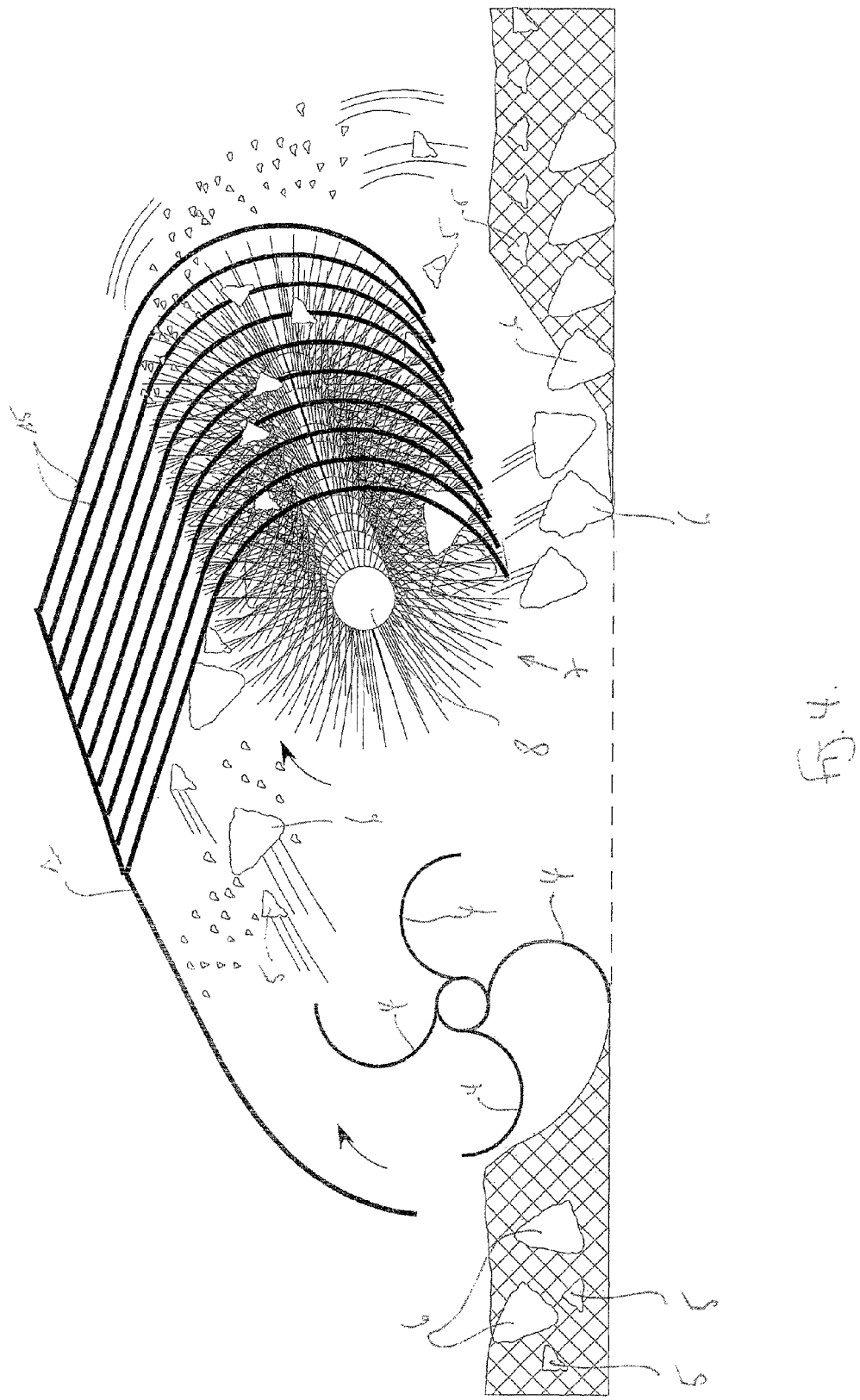

FARMING IMPLEMENT FOR SEPARATING GROUND ELEMENTS

CROSS-REFERENCE TO RELATED APPLICATIONS

This application is a national stage application under 35 U.S.C. 371 of PCT Application No. PCT/IB2008/050623 having an international filing date of Feb. 21, 2008, which designated the U.S., which PCT application claimed the benefit of European Patent Application Ser. No. EP 07103241.1 filed Feb. 28, 2007, the entire disclosure of each of which are hereby incorporated herein by reference.

FIELD OF THE INVENTION

The present invention relates to agricultural machines, commonly called separators, sieving machines or destoners/clod-breakers, which are used to separate ground elements, such as stones, clods or roots.

STATE OF THE ART

The documents U.S. Pat. No. 4,548,275 and GB 2 238 219 describe separators that comprise at least one grid-type conveyor belt through which ground elements, smaller than a certain size, can pass and return to the ground, the elements of larger size being routed to the end of the conveyor belt to be discharged into ploughed furrows or possibly to be recovered in a vessel.

The document U.S. Pat. No. 5,671,839 describes a grid-type conveyor belt which can be used with a separator as described previously.

The separation of ground elements can also be done by means of cylinders separated from each other by a distance that corresponds roughly to the maximum size of the elements that return to the ground. As an illustration of this second type of separation, reference can also be made to the document GB 2 238 219.

The separation cylinders can also have a section, the form of which roughly resembles a star. The CombiStar CS 1500/CS 1700 machines from GRIMME can be provided with the type of cylinder.

The machines of the state of the art do, however, offer a number of drawbacks.

The wear of the separation means (conveyor belt, cylinders, etc) is fairly rapid because of the high load that is imposed by the weight of elements to be separated.

This same load can also not work at high transport speeds, which results in a relatively lengthy separation process.

Moreover, if effective separation is required, it is important to have separation means that are distributed over a long distance, hence the need to have the use of a relatively lengthy separator, and therefore one that is more difficult to control.

The separators that use a conveyor belt of the type described in the document U.S. Pat. No. 5,671,839 also offer the major drawback of not producing a satisfactory grading.

In practice, when the mass of elements is moving on the conveyor belt, the crushing of the clods—which occurs in all cases, with or without backstay—results in a deposition of earth on the surface of the rods. This "sticking" phenomenon has the effect of reducing the spacing between the rods so that only small elements can return to the ground. This fine sieving is not desirable because it can result in the formation of a compact mass of earth, a kind of cement that deprives the soil of the necessary aeration.

It should be noted that this problem cannot be settled easily by providing a spacing between the rods that is greater than that of the size of the elements that are required to return to the ground. If this solution were adopted, stones of relatively large diameter could then also return to the ground, which would render the latter unsuitable for cultivation.

Finally, the U.S. Pat. No. 3,563,191 describes another earth preparation system. This system is used to prepare the earth by digging the latter and by spraying it backward onto a sieve that is slightly inclined from the vertical. This sieve is used to sort the earth from the stones and to break up any clods that are present. The stones and debris that do not pass through the sieve fall directly into the dug-out trench whereas the earth that has passed through the sieve then falls back over these stones and covers them. More specifically, the earth and the stones that are collected by teeth are sprayed backward relative to the direction of the system, then upward by said teeth against the sieve.

As in the known systems cited hereinabove, the system disclosed by the U.S. Pat. No. 3,563,191 also has disadvantages. Notable among these is the "sticking" phenomenon that can occur on the sieve and thus reduce its hole size.

SUMMARY OF THE INVENTION

One aim of the present invention is to improve the known systems.

More specifically, one aim of the present invention is to propose a system that is simple, easy to set up and efficient.

Another aim is to propose a system that is easy to transport and stow away.

These aims are achieved by a separator as defined in the claims.

The separator comprises the following elements:
- a frame designed to be pulled by a tractor or moved independently
- transport and separation means linked to the frame to transport and separate elements
- reception means situated behind the separator to receive, optionally direct, the elements held by the transport and separation means.

In the separator according to the invention, the transport and separation means that initially receive the elements to be separated comprise
- a first rotary means which digs up and collects the elements intended to be processed forming a trench
- a second rotary transport and separation means receiving the elements from the first rotary means
- said second means cooperating with a sorting means for separating the elements according to their size and said second means transporting the sorted elements that have not been separated and depositing them in the trench, and said sorting means making it possible to deposit the separated elements on the non-separated elements in the trench.

Preferably, the first rotary means is a rotary cultivator.
Preferably, the second rotary means is a rotary brush.
Preferably, the sorting means is a plate including holes arranged in the form of a matrix or a sieve, or even a wire mesh, or even bars.

In a particularly advantageous variant, the plate, respectively the sieve, the wire mesh or the bars, is (are) incurved so as to at least partially follow the curvature of the rotary brush.

The sorting means can be attached to the frame by any appropriate attachment means (screws, pins, welding, etc).

Thus, the elements of a size greater than that accepted by the sorting means are deposited into the bottom of the part dug out by the first rotary means.

Then, only the elements that have passed through the sorting means return to the part of the ground situated below the transport and separation means, but above the elements of larger size.

In addition to the fact that, for a predetermined separation effectiveness, the separator according to the invention is more compact than those of the state of the art, it has the merit of considerably reducing the wear on the transport and separation means.

It should be noted, finally, that the subject of the present invention can be incorporated in machines of the state of the art. As an example of such a machine, that described in the Swiss application number 0075/99 also filed by the author of this invention can be cited.

In a second embodiment of the invention, a conveyor belt is used between the first rotary means and the second rotary means.

In a third embodiment of the invention, a pre-mesh between the first rotary means and the second rotary means is used to obtain a first sorting.

One advantage of the system is that it uses centrifugal force to perform the separation which is much more effective than the solutions proposed in the state of the art. The sprayed elements have their own kinetic energy and there is no need to use any other additional means. Obviously, such an additional means can be provided, as in the second embodiment mentioned hereinabove.

Another advantage of the present invention is that, by this use of centrifugal force, the sorting means (the plate or the wire mesh) is "self-cleaning" because of the shocks that it undergoes in operation but also because of the rubbing of the brush. The problems of sticking mentioned at the start of this description, a fact with the known systems, are thus in particular avoided.

BRIEF DESCRIPTION OF THE FIGURES

Three embodiments of the invention will be described hereinbelow by means of the following figures in which:

FIG. 2 represents a separator according to the invention seen from the side according to a second embodiment.

FIG. 3 represents a separator according to the invention seen from the side according to a third embodiment.

FIG. 4 represents a variant of the separator according to the invention.

DETAILED DESCRIPTION OF THE INVENTION

Figure 1:
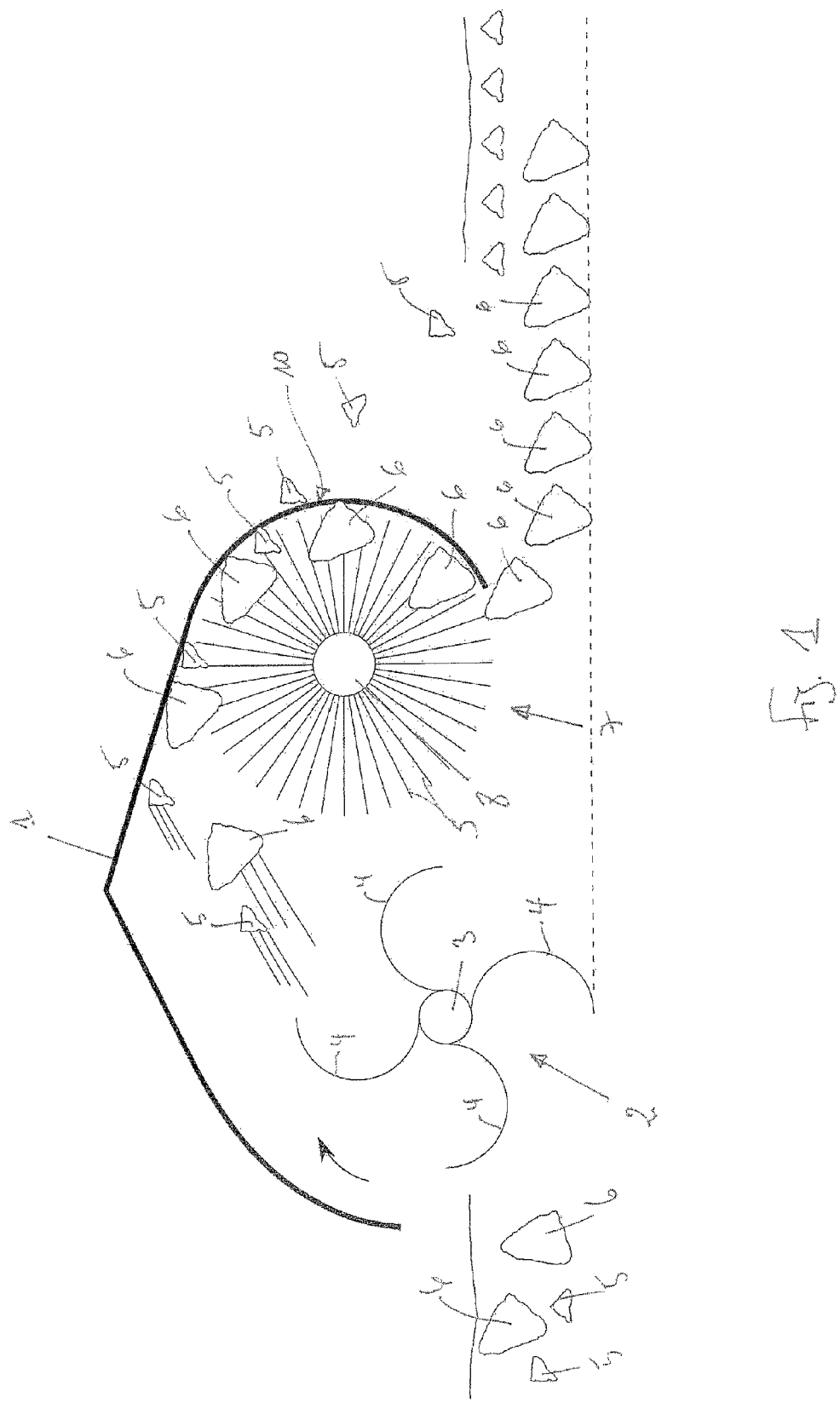
FIG. 1 illustrates a separator according to the invention seen from the side according to a first embodiment.

In FIG. 1, the first embodiment of the separator according to the invention is represented. This separator comprises a frame or chassis 1 designed to be attached to a vehicle, for example of tractor type (not represented). The frame 1 supports the elements of the separator, in particular a first rotary means 2 which digs up and collects the elements intended to be treated, in the form of a rotary cultivator 2. This rotary cultivator is attached to the frame, for example, by a shaft 3 and comprises cultivating cups 4 which dig into the earth. This cultivator is driven in the direction indicated by the arrow and through a mechanism comprising universal joints and gears (not represented), known per se in the agricultural machines operated by a tractor.

The earth, the clods and the stones, diagrammatically illustrated by the references 5, 6 carried in the rotating cups 4 are sprayed upward and backward from the frame as diagrammatically represented in FIG. 1. When they encounter the frame, the earth, the clods and the stones 5, 6 fall back, the earth directly to the ground, whereas the clods are broken up. The stones 5 and 6 fall back into the second rotary means which has the form of a rotary brush 7. This brush comprises a shaft 8 on which hairs 9 are fitted.

The stones 5 and 6 are carried away by the rotation of the brush 7, and are "jammed" between the hairs 9 and an incurved rear portion of the frame. This portion is generally referenced by means of the numeric reference 10.

At this point of the frame, a plate is mounted that has holes, or for example a sieve or a wire mesh, which enables the stones that do not exceed a certain size to pass through this plate whereas the other stones continue to be moved by the brush 7. In FIG. 1, this effect is diagrammatically represented by the stones 5 located to the right of the part referenced 10. The plate therefore operates as a sieve whose fineness makes it possible to choose the size of stone that can pass through said sieve.

The other stones that are too large to pass through the plate (these stones are identified by the reference 6) ultimately fall into the bottom of the plowed furrow which is dug out by the rotary cultivator 2. However, the stones 5 that have passed through the plate are ultimately located on top of the stones 6, as represented in FIG. 1.

Thus, the system according to the invention makes it possible to form layers in which the large stones are at the bottom, those of smaller size above, as represent on the right hand side of FIG. 1 with the loose soil which will also have passed through the plate/sieve.

As for the rotary cultivator 2, the brush 7 is preferably driven by means of the system of universal joints and gears mentioned hereinabove for the rotary cultivator 2 or an equivalent means.

FIG. 2 shows a second embodiment of the separator. In this embodiment, the elements that are identical to the first embodiment are referenced with the same numbers and the description given hereinabove applies correspondingly.

The main difference between this second embodiment and the first embodiment of FIG. 1 lies in the presence of a conveyor belt 11 mounted on shafts 12 (at least one of which is driven). The benefit of this embodiment is to ensure a more "predictable" transportation of the earth and the stones on the brush 7, said brush being responsible for simplifying the sieving of the stones delivered by the belt 11.

FIG. 3 shows a third embodiment of the separator. In this embodiment, the elements that are identical to the first embodiment are referenced with the same numbers and the description given hereinabove applies correspondingly.

The main difference between this third embodiment and the first embodiment of FIG. 1 lies in the presence of a pre-mesh 13 mounted between the rotary cultivator 2 and the brush 7. The benefit of this embodiment is that it allows for a first rougher sieving of the earth and stones collected before they are received by the brush 7. Thus, the stones 14 that are larger than the stones 6 do not pass through this first sieve and fall into the trench first, as represent below the pre-mesh 13. This embodiment thus allows for a finer sieving in as much as the sieve 10 can be finer than in the first two embodiments described.

The pre-mesh 13 can be mounted by any appropriate means, for example welding, screwing, etc. Preferably, a support frame is used that provides for a better securing of the pre-mesh.

FIG. 4 shows, in perspective, a variant of the separator. In this variant, the same elements are referenced as in the preceding figures. More specifically, this figure shows bars 15 that are curved back so as to approximately follow the curvature of the brush 7 and that form the sorting means. They can be individual bars of circular section (in order to be sufficiently rigid) mounted parallel to one another on the frame 1.

In another variant, these bars can be cut from a plate, for example made of metal, which would be curved back. In this case, a configuration would be obtained with slots that can be more or less elongate in the plate.

The variant of FIG. 4 can be applied to all the embodiments described.

Obviously, the embodiments given, are given by way of illustrative and nonlimiting examples, and variations are possible, notably by the use of equivalent means.

NUMERIC REFERENCES

1 Frame, chassis
2 Rotary cultivator
3 Rotary cultivator shaft
4 Rotary cultivator cups
5 Stones (small)
6 Stones (large)
7 Secondary rotary means (brush)
8 Brush shaft
9 Hairs of the brush
10 Holed plate, sieve, wire mesh
11 Conveyor belt
12 Shafts of belt 11
13 Pre-mesh for pre-sieving
14 Stones of larger size (than the stones 6)
15 Bars

The invention claimed is:

1. A separator for an agricultural machine comprising the following elements:
    a frame designed to be pulled by a tractor or moved independently;
    transport and separation means linked to the frame to transport and separate elements, the transport and separation means comprising a first rotary means which digs up and collects substantially all of the elements in its path and forms a continuous trench in the ground, and a second rotary means receiving the elements from the first rotary means;
    said second rotary means cooperating with a sorting means for separating the received elements according to their size, said second rotary means further transporting the sorted elements that have not been separated by said sorting means and re-depositing them in the trench, and wherein the sorted elements that have been separated by said sorting means are redeposited over the non-separated elements in the trench.

2. The separator as claimed in claim 1, in which the first rotary means is a rotary cultivator.

3. The separator as claimed in claim 1, in which the second rotary means is a rotary brush.

4. The separator as claimed in claim 1, in which the sorting means is a plate including holes arranged in the form of a matrix, or slots or a wire mesh.

5. The separator as claimed in one of claim 1, in which the sorting means is formed by parallel bars.

6. The separator as claimed in claim 3, in which the sorting means is incurved so as to partially follow the curvature of the rotary brush.

7. The separator as claimed in claim 1, comprising a belt situated between the first rotary means and the second rotary means.

8. The separator as claimed in claim 1, comprising a sorting pre-mesh situated between the first rotary means and the second rotary means.

9. An agricultural machine comprising a separator as claimed in claim 1.

\* \* \* \* \*